United States Patent [19]
Steiner et al.

[11] Patent Number: 6,068,778
[45] Date of Patent: May 30, 2000

[54] WATER PURIFICATION SYSTEM

[75] Inventors: Carl A. Steiner, Erie; Ricky L. Jackson, Union City, both of Pa.

[73] Assignee: TM Industrial Supply, Inc., Erie, Pa.

[21] Appl. No.: 08/992,363

[22] Filed: Dec. 17, 1997

Related U.S. Application Data

[60] Provisional application No. 60/053,124, Jul. 18, 1997.

[51] Int. Cl.[7] .................................................. C02F 1/78
[52] U.S. Cl. ........................................ 210/760; 210/765
[58] Field of Search .................................. 210/760, 764, 210/765

[56] References Cited

U.S. PATENT DOCUMENTS

| | | | |
|---|---|---|---|
| 1,853,045 | 4/1932 | Gnau . | |
| 3,448,045 | 6/1969 | Hess et al. | 210/63 |
| 3,696,929 | 10/1972 | Shah | 210/199 |
| 3,772,188 | 11/1973 | Edwards | 210/15 |
| 4,007,118 | 2/1977 | Ciambrone | 210/63 Z |
| 4,029,578 | 6/1977 | Turk | 210/63 Z |
| 4,104,166 | 8/1978 | LaRaus | 210/195 R |
| 4,123,800 | 10/1978 | Mazzei | 366/150 |
| 4,857,204 | 8/1989 | Joklik | 210/695 |
| 4,959,142 | 9/1990 | Dempo | 210/167 |
| 5,015,394 | 5/1991 | McEllhenney et al. | 210/760 |
| 5,061,377 | 10/1991 | Lee et al. | 210/752 |
| 5,075,016 | 12/1991 | Barnes | 210/760 |
| 5,145,582 | 9/1992 | Krofta | 210/609 |
| 5,145,585 | 9/1992 | Coke | 120/695 |
| 5,174,905 | 12/1992 | Shaw | 210/760 |
| 5,186,841 | 2/1993 | Schick | 210/760 |
| 5,273,664 | 12/1993 | Schulz | 210/759 |
| 5,302,298 | 4/1994 | Leitzke | 210/748 |
| 5,314,613 | 5/1994 | Russo | 208/184 |
| 5,338,341 | 8/1994 | Mazzei et al. | 96/208 |
| 5,364,537 | 11/1994 | Paillard | 210/743 |
| 5,380,471 | 1/1995 | Ban et al. | 261/122.1 |
| 5,427,693 | 6/1995 | Mausgrover et al. | 210/739 |
| 5,494,576 | 2/1996 | Hoppe et al. | 210/198.1 |
| 5,494,583 | 2/1996 | Dieter | 210/758 |
| 5,512,178 | 4/1996 | Dempo | 210/638 |
| 5,665,228 | 9/1997 | Leaverton et al. | 210/760 |
| 5,674,312 | 10/1997 | Mazzei | 95/261 |

OTHER PUBLICATIONS

Mazzei Injector Corporation brochure, "Mazzei Injectors Make The Best Ozone Systems . . . Better" (undated).

European Patent Office Patent Abstract of Japan, Application No. 61067803, published Oct. 5, 1987, 1 page.

*Primary Examiner*—David A. Simmons
*Assistant Examiner*—Betsey J. Morrison
*Attorney, Agent, or Firm*—Webb Ziesenheim Logsdon Orkin & Hanson, P.C.

[57] ABSTRACT

A water purification system is disclosed using a recirculation loop to extract water from a vessel, injecting ozone into the extracted water and then introducing the water/ozone mixture into the vessel to blend the ozone with all of the water in the vessel.

9 Claims, 2 Drawing Sheets

WATER PURIFICATION SYSTEM

CROSS REFERENCE TO RELATED APPLICATION

This application claims the benefit of earlier filed United States Provisional Application Ser. No. 60/053,124 filed on Jul. 18, 1997 entitled "Water Purification System".

BACKGROUND OF THE INVENTION

FIELD OF THE INVENTION

The invention is directed toward a water purification system which injects ozone into a stream of water extracted from a vessel and then introduces this water/ozone mixture to the remaining water in the vessel to enhance purification.

Ozonation is the technological process whereby ozone, a natural but highly activated form of oxygen, is injected into water. The result of ozonation is cleaner, clearer and more odor free water than is possible by other standard purification methods. At the present time, chlorine is the most widely used chemical in the treatment of water. It is effective in killing or neutralizing many microorganisms that carry and spread disease. However, chlorine has properties that also may make it harmful to people, animals and the environment in general. This is being recognized worldwide and new standards governing the use of chlorine and chlorine compounds call for a major reduction and restriction in their applications in treating water. Ozone has all the characteristics to qualify it as the ideal alternative to chlorine in treating water.

The system described hereinafter is a water purification system utilizing ozone in an efficient manner such that a lesser amount of ozone may be used for water purification, thereby reducing the overall cost of a water purification system and furthermore reducing the size of such a water purification system.

SUMMARY OF THE INVENTION

One embodiment of the invention is a method of using ozone for purification of water within a vessel including the steps of injecting ozone into a stream of water to produce a first ozone concentration within the stream of water, introducing the stream of ozonated water into the vessel to produce a second ozone concentration within the water of the vessel, wherein the first ozone concentration is greater than the second ozone concentration.

Another embodiment of the invention is an apparatus for purifying water using ozone that includes a vessel for holding water, a secondary inlet line extending to the vessel through which water may be introduced to the water in the vessel, and an arrangement for ozonating water prior to it entering the secondary inlet line.

DESCRIPTION OF THE PREFERRED EMBODIMENTS

Figure 1:
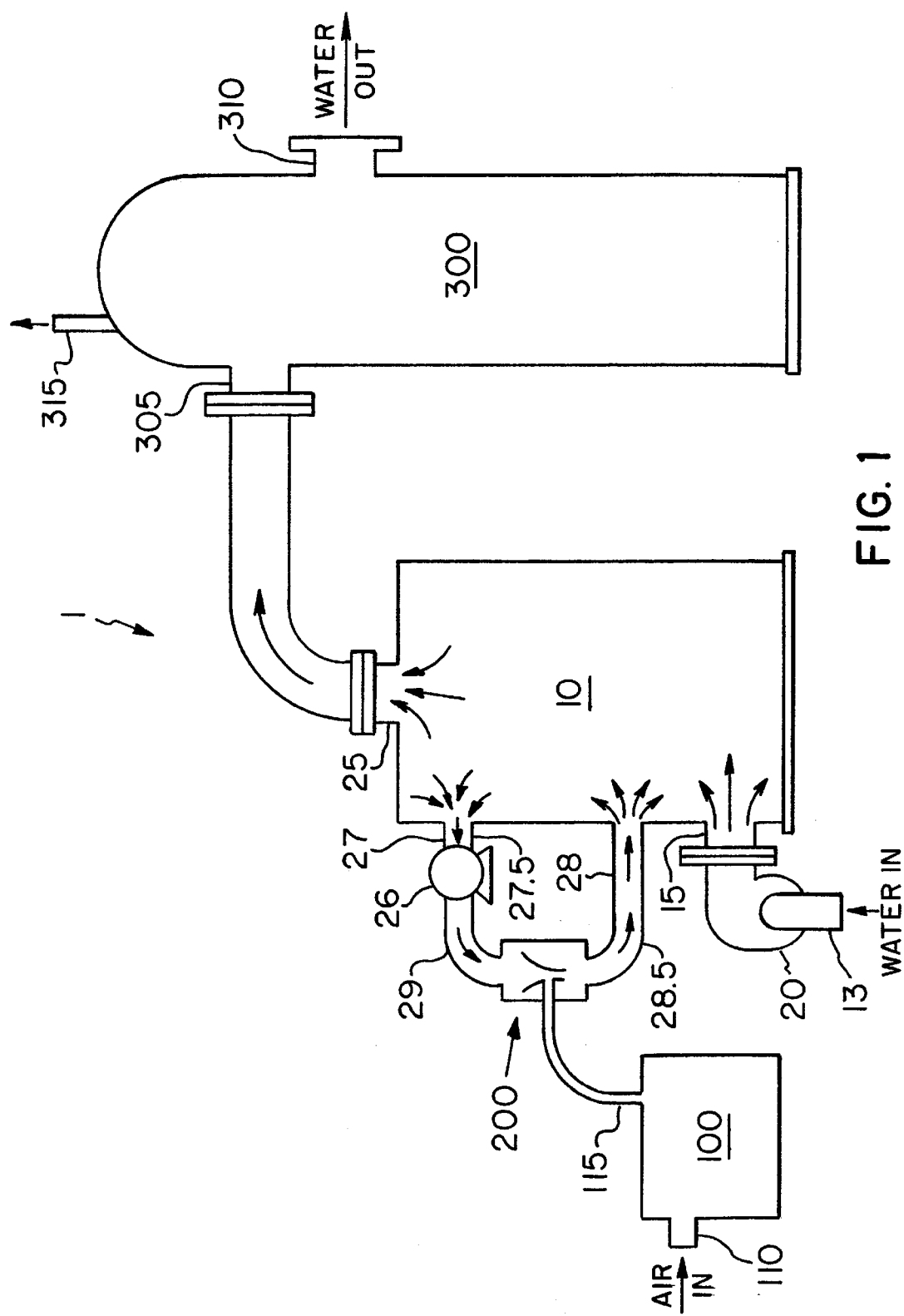
FIG. 1 illustrates a schematic of a water purification system in accordance with the subject invention.

FIG. 1 shows a water purification system made in accordance with the present invention that is broadly made up of four components which are (1) an ozone retention tower 10; (2) an ozone generator 100; (3) an injector 200; and (4) a de-gas tank 300. Bacteria-laden water from raw sewage or any other contaminated water is introduced into a vessel identified as the ozone retention tower 10 at inlet nozzle 15. The water may be introduced from a supply line 13 to the inlet nozzle 15 with sufficient pressure to carry it through the entire system. However, a booster pump 20 may be necessary to maintain the pressure throughout the system. The nozzle 15 may be mounted to the cylindrical tower 10 in a tangential offset orientation to promote swirling within the tower 10. The nozzle 15 may also be mounted in a non-tangential orientation. In the event large particles or sediment are in the water, a filter (not shown) may be used to pre-process the water. Water is directed through the ozone retention tower 10 in a manner which maximizes mixing within the tower 10. This may be accomplished using a plurality of baffles and mesh, such as steel wool, as will be described.

The water in the ozone retention tower 10 is mixed with ozone gas as it travels from the inlet nozzle 15 to the outlet nozzle 25 using an injector 200 which receives water through a pump 26 from a secondary outlet nozzle 27 of the ozone retention tower 10 and mixes it with ozone gas from another source. The water/ozone mixture is then reintroduced to the ozone retention tower 10 through the secondary inlet nozzle 28. The secondary outlet nozzle 27, injector 200 and secondary inlet nozzle 28 generally define a secondary mixing loop 29.

It should be appreciated that the secondary inlet nozzle 28 directs the water/ozone mixture near the bottom of the tower 10 As a result, water introduced at the inlet nozzle 15 will travel upward toward outlet nozzle 25 and will blend with the water/ozone mixture from secondary inlet nozzle 28. The secondary inlet nozzle 28 may be mounted to the cylindrical tower 10 in a tangential offset orientation to promote swirling within the tower 10. The water/ozone mixture will be dispersed throughout the water above inlet nozzle 28 such that soon after startup of the system, secondary outlet nozzle 27 will be fed with a diluted water/ozone mixture and not water alone. Therefore, soon after startup, the water from the inlet nozzle 15 will always be blended with the water/ozone mixture from the secondary inlet nozzle 28 before entering the secondary mixing loop 29. The ozone concentration leaving the secondary inlet nozzle 28 should be at a concentration level so that the ozone concentration entering the secondary outlet nozzle 27 would be about equal to or greater than 0.4 mg/liter, based upon a constant water flow rate. The purification system as described and when sized properly is capable of processing water introduced at any flow rate; however, it is believed the system will be effective and most economical at flow rates below 1000 gallons per minute.

With it understood that after startup the contents of the ozone retention tower 10 will be a water/ozone mixture with an ozone concentration less than that of the water/ozone mixture leaving the secondary inlet nozzle 28, then for convenience, the contents of the tower 10 will hereinafter be referred to as water, while the contents of the secondary mixing loop 29 will be referred to as a water/ozone mixture.

The ozone gas is provided by an ozone generator 100 to the injector 200 which has a throat with a venturi arrangement or another device capable of mixing the ozone with the water. Ozone generators are known in the art and available through a number of manufacturers, including the company Trio3gen of Fort Pierce, Fla. Generally speaking, an ozone generator takes air from the atmosphere and electrically charges it and removes certain elements to provide ozone gas at the outlet 115.

The secondary mixing loop 29 draws off a portion of the water flowing through the tower 10 at the secondary outlet nozzle 27 through the secondary outlet line 27.5. This portion of water is mixed with ozone gas and reintroduced to the tower 10 through a secondary inlet nozzle 28 supplied by a secondary inlet line 28.5. The inventors have discovered that superior water purification may be attained by introducing ozone gas first into only a portion of the water flowing through the tower 10 and then sufficiently mixing this water/ozone mixture within the tower 10 to purify the remaining water. It has been found that introducing ozone gas to about 10% of the water, which is the water flowing through the secondary loop 29, may be sufficient to purify all of the water in the tower 10. It is believed the amount of ozone gas mixed with the water extracted from the tower 10 for purification may be substantially less than the amount of ozone gas that in the past has been directly mixed with the water from the tower 10. This reduction in ozone gas may not only provide for a more efficient operation but may furthermore permit a reduction in capacity of the ozone generator 100 since now less ozone gas may be needed in the purification process.

Within the tower 10 may be a series of baffles and mesh, such as steel wool, that promote agitation and turbulence of the water/ozone mixture flowing therethrough.

The flow rate of the water from the inlet nozzle 15 is controlled such that the residence time of water in the tower 10 is predetermined. It has been determined that microorganisms and bacteria in the water may be destroyed by the ozone gas when the water/ozone mixture is resident in the tower 10 for a period of time such as, for example, two minutes or more. A preferred time is about two minutes. However, the residence time may also be less than two minutes. It has further been determined that when the water/ozone mixture is resident in the tower 10 for approximately four minutes or more, calcium will precipitate from the water, thereby providing an additional benefit beyond the elimination of bacteria and microorganisms. A preferred time is about four minutes.

The ozone gas must be removed from the water prior to further processing. The water/ozone mixture leaves the tower 10 from outlet nozzle 25 and travels into the de-gas tank 300 through inlet nozzle 305. The water/ozone mixture is processed within the de-gas tank 300 such that the ozone and water are separated. The water is discharged from the de-gas tank 300 from the outlet nozzle 310 while the gas is discharged to the atmosphere through outlet nozzle 315.

It should be appreciated that the method herein described is effective against bacteria and microorganisms and is not directed toward particulate or solid waste. Therefore, it may be desired to remove particulate matter from the water using filters at desired points along the process. Furthermore, the ozone gas acting upon the water acquires what may be an objectionable odor and therefore may be passed through a filter (not shown) such as one comprised of charcoal granules to remove such an odor prior to the gas from the outlet nozzle 315 being released to the atmosphere.

Figure 2:
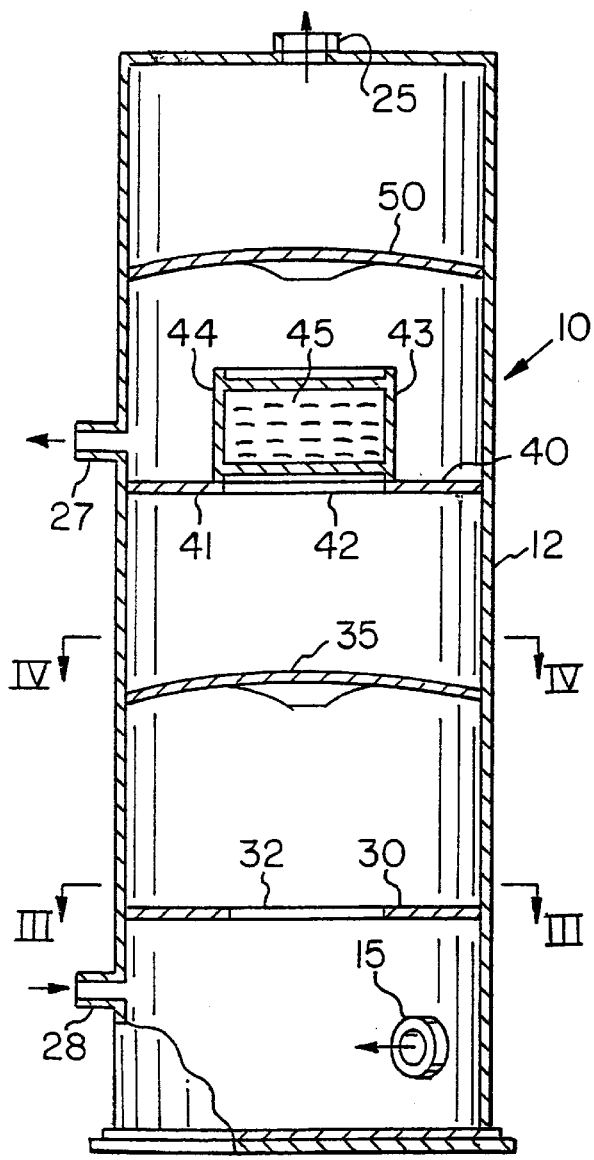
FIG. 2 is a cross-sectional view of an ozone retention tower in accordance with the subject invention.

FIG. 2 provides further details of the ozone retention tower 10. The tower 10 is generally comprised of a vessel or shell 12 which may be cylindrical in shape. As previously discussed, water is introduced at the inlet nozzle 15 and leaves the tower 10 at the outlet nozzle 25. Water is extracted from the tower 10 at the secondary outlet nozzle 27 and ozone gas is introduced to the water by the injector 200 (not shown). The water/ozone mixture is then reintroduced to the water within the tower 10 at the secondary inlet nozzle 28. Inlet nozzle 15 may be mounted to the tank 10 in a tangential offset orientation, as shown in FIG. 2. Although not shown, secondary inlet nozzle 28 may be mounted in a similar offset manner. Nozzle 15 and nozzle 28 may also be mounted such that either one or both are not tangentially offset relative to the tank 10.

The primary task of the ozone retention tower 10 is to expose the contaminated water to the ozone gas to destroy bacteria and microorganisms in the water. In order to do this, it is necessary to thoroughly mix the ozone gas with the water. In addition to mixing caused by turbulence from introducing water from the inlet nozzle 15 and the secondary inlet nozzle 28 to the tower 10, mixing is also caused by flow through a series of baffles within the tower 10. Water coming from the inlet nozzle 15 is introduced at the bottom of the tank 10 and moves upwardly as additional water is introduced. Nozzle 15 may permit the water to enter tangentially into the tower 10 to promote swirling and mixing of the water. While a number of different baffle arrangements may be possible, it has been determined that four baffles as shown in the tower 10 produce satisfactory results.

Figure 3:
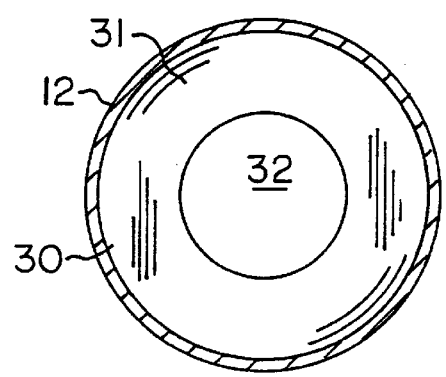
FIG. 3 is a cross-sectional view of the ozone retention tower along lines "III—III" in FIG. 2.

A first baffle 30 as shown in FIG. 3 is made of a plate 31 mounted against the walls of the vessel 12. The plate 31 defines a central aperture 32 extending therethrough to force the water flow toward the center of the vessel 12.

Figure 4:
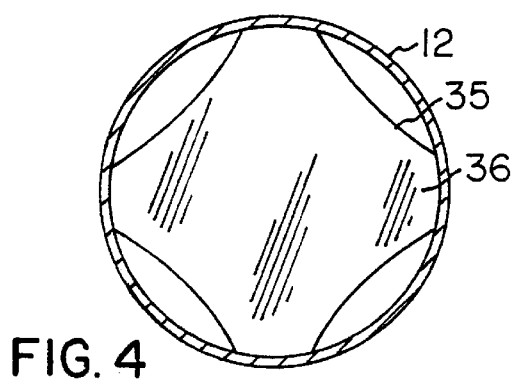
FIG. 4 is a cross-sectional view of the ozone retention tower along lines "IV—IV" in FIG. 2.

A second baffle 35 as shown in FIG. 4 is mounted above the first baffle 30 and is a square plate 36 having rounded corners which are mounted to the walls of the vessel 12. This configuration forces the flow of the water against the wall of the vessel 12 thereby promoting mixing of the water and ozone. The second baffle 35 may be arched upwardly in the fashion illustrated in FIG. 2.

Returning to FIG. 2, a third baffle 40 is positioned above the second baffle 35 and is a plate 41 with a central aperture 42 similar to that of baffle 30 previously described. Just as was the goal for baffle 30, baffle 40 again forces the flow of the water through a central aperture 42 toward the center of the vessel 12. An optional feature to further increase the turbulence and mixing of the water/ozone combination is a dispersing mesh 43 made up of a sleeve 44 which fits over aperture 42. Voids 45 within the mesh 44 permit passage of the water/ozone mixture and promote further mixing. It should be appreciated that particulate matter may be restrained by the voids 45 and for that reason, if a dispersing mesh is to be introduced, it may be necessary to pre-filter the water to remove such particulates or, in the alternative, to enlarge the size of the voids 45 enabling any particulate matter to pass through unobstructed.

A fourth baffle 50 is placed above the third baffle 40 and is similar to the second baffle 35.

The water/ozone mixture is drawn off at outlet nozzle 27 and, as previously discussed, mixed with ozone gas before being reintroduced into the tower 10 at inlet nozzle 28. By introducing this water/ozone mixture at inlet nozzle 28 which is located at the bottom of the vessel 12, the mixing benefit provided by the turbulence created within the vessel 12 is maximized.

Once the ozone has been resident in the water for the desired time, then the ozone must be removed prior to using the now purified water. Therefore, the water/ozone mixture exits the tower 10 at the outlet nozzle 25 and is pumped to the de-gas tank 300.

Figure 5:
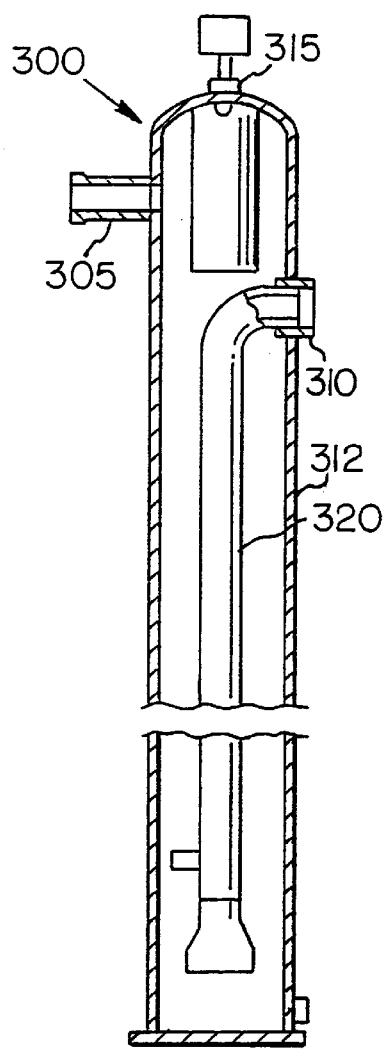
FIG. 5 is a cross-sectional view of a de-gasser tower used with the water purification system.

The de-gas tank 300 functions to remove the ozone gas introduced in the ozone retention tower 10. Details of the de-gas tank 300 are found in FIG. 5. The de-gas tank 300 includes a vessel 312 in the shape of a tower having an inlet nozzle 305 to receive the water/ozone mixture from the ozone retention tower 10. The ozone gas is removed from the water and discharged through gas outlet nozzle 315 while the processed water is discharged through outlet nozzle 310.

The arrangement of the tank 300 is designed to permit the gas mixed into the water to float to the top of the water for separation. The inlet nozzle 305 is located at the top of the vessel. The water/ozone mixture is forced down to the bottom of the vessel 312 and it is during this time the ozone separates from the water and travels upwardly toward the outlet nozzle. This separation process is enhanced by forcing the water/ozone mixture to the bottom of the vessel because the increased hydrodynamic pressure at the bottom of the vessel will further urge the gas mixture to the top of the vessel 312. At the bottom of the vessel 312 the water enters an exit pipe 320 and is forced upward to the outlet nozzle 310 for further processing, if desired.

At this point, what was originally water contaminated with bacteria and microorganisms has been purified and the ozone gas that was introduced to the water to provide this function has been removed. Any residue that may have accumulated in the ozone retention tower 10 or the de-gas tank 300 may be removed from the bottom of the tower 10 or tank 300. Such residue may be precipitated calcium or organic material from the bacteria or microorganisms destroyed by the ozone.

What has been described is a water purification system which in a first stage introduces ozone gas to a portion of the water in an ozone retention tower and in a second stage introduces this water/ozone mixture to the remaining water in the ozone retention tower. Mixing devices such as baffles and mesh within the ozone retention tower ensure that the ozone gas interacts with the water to destroy bacteria and microorganisms.

Although this invention has been described with reference to a specific embodiment thereof, numerous modifications are possible without departing from the invention, and it is desirable to cover all modifications falling within the spirit and scope of this invention.

We claim:

1. A method of using ozone for purification of water flowing through a vessel from an inlet nozzle to an outlet nozzle wherein the inlet nozzle is at a first elevation, comprising the steps of:

a) injecting ozone into a stream of water to produce a first ozone concentration of ozonated water within the stream of water;

b) introducing the stream of water into the vessel at a second elevation in the vessel between the inlet nozzle and the outlet nozzle to produce a second ozone concentration of ozonated water within the vessel, wherein the first ozone concentration is greater than the second ozone concentration; and c) supplying the stream of water using ozonated water which is extracted directly from the vessel at an elevation higher than either the first or second elevations and has an ozone concentration greater than the ozone concentration of the water entering the vessel through the inlet nozzle.

2. The method according to claim 1 wherein the first ozone concentration is sufficient to obtain a second ozone concentration about equal to or greater than 0.4 mg/liter.

3. The method according to claim 1 further comprising the step of agitating the ozonated water in the vessel to promote mixing.

4. The method according to claim 3 wherein the step of agitating is caused in part by introducing the stream of ozonated water into the vessel.

5. The method according to claim 3 wherein the step of agitating is caused by forcing the water to flow around baffles positioned within the vessel.

6. The method according to claim 1 further comprising the step of retaining the ozonated water within the vessel for a period of at least about two minutes.

7. The method according to claim 1 further comprising the step of retaining the ozonated water within the vessel for a period of at least about four minutes.

8. The method according to claim 1 further comprising the step of maintaining a flow of water through the vessel.

9. The method according to claim 8 wherein the flow through the vessel is up to a rate of about one thousand gallons per minute.

* * * * *